US012633817B2

(12) United States Patent
Hora et al.

(10) Patent No.: US 12,633,817 B2
(45) Date of Patent: May 19, 2026

(54) CORRECTION CIRCUIT

(71) Applicant: Renesas Design (UK) Limited, Bourne End (GB)

(72) Inventors: Codrin Hora, Edinburgh (GB); Guillaume De Cremoux, Edinburgh (GB); Vladislav Vasilev, Edinburgh (GB)

(73) Assignee: Renesas Design (UK) Limited, Bourne End (GB)

( * ) Notice: Subject to any disclaimer, the term of this patent is extended or adjusted under 35 U.S.C. 154(b) by 209 days.

(21) Appl. No.: 18/361,240

(22) Filed: Jul. 28, 2023

(65) Prior Publication Data

US 2025/0038646 A1 Jan. 30, 2025

(51) Int. Cl.
| | |
|---|---|
| *H02M 3/158* | (2006.01) |
| *H02M 1/00* | (2006.01) |
| *H02M 1/088* | (2006.01) |
| *H02M 3/157* | (2006.01) |

(52) U.S. Cl.
CPC ......... *H02M 1/088* (2013.01); *H02M 1/0009* (2021.05); *H02M 3/157* (2013.01); *H02M 3/158* (2013.01)

(58) Field of Classification Search
CPC ........ H02M 3/157; H02M 3/158; H02M 3/56; H02M 3/1563; H02M 3/586; H02M 1/088; H02M 1/084; H02M 1/0845; H02M 1/082; H02M 1/0009; H02M 1/0003
See application file for complete search history.

(56) References Cited

U.S. PATENT DOCUMENTS

| | | | |
|---|---|---|---|
| 9,419,627 | B2 | 8/2016 | Guthrie et al. |
| 9,667,260 | B2 | 5/2017 | Guthrie et al. |
| 2006/0043954 | A1 | 3/2006 | Markowski |
| 2006/0044709 | A1 | 3/2006 | Seiersen |
| 2007/0103122 | A1 | 5/2007 | Morong et al. |
| 2007/0165427 | A1 | 7/2007 | McDonald et al. |
| 2008/0278124 | A1 | 11/2008 | Aiura et al. |
| 2009/0102446 | A1 | 4/2009 | Takahashi et al. |
| 2009/0174262 | A1 | 7/2009 | Martin et al. |
| 2010/0188062 | A1 | 7/2010 | Candage et al. |
| 2011/0019446 | A1 | 1/2011 | Wu et al. |
| 2011/0227549 | A1 | 9/2011 | Huang et al. |

(Continued)

FOREIGN PATENT DOCUMENTS

DE 102015102783 A1 8/2015

OTHER PUBLICATIONS

US Non-Final Office Action dated May 7, 2025 issued in U.S. Appl. No. 18/361,274.
US Notice of Allowance dated May 21, 2025 issued in U.S. Appl. No. 18/361,372.
US Non-Final Office Action dated Apr. 28, 2025 issued in U.S. Appl. No. 18/361,345.

(Continued)

*Primary Examiner* — Nguyen Tran
(74) *Attorney, Agent, or Firm* — SCULLY, SCOTT, MURPHY & PRESSER, P.C.

(57) ABSTRACT

A correction circuit for correcting one or more errors in a digitized current signal, the digitized current signal being a digital representation of an analog current signal of a current flow through an energy storage element, wherein the correction circuit is configured to correct the one or more errors in the digitized current signal by comparing the digitized current signal to the analog current signal, and correcting the digitized current signal based on the outcome of the comparison.

20 Claims, 16 Drawing Sheets

(56) References Cited

U.S. PATENT DOCUMENTS

| | | | |
|---|---|---|---|
| 2014/0084886 A1 | 3/2014 | Causse et al. | |
| 2015/0003122 A1 | 1/2015 | Cui et al. | |
| 2015/0303790 A1* | 10/2015 | Lin | H02M 1/4225 |
| | | | 363/89 |
| 2016/0352237 A1 | 12/2016 | Quigley | |
| 2016/0359489 A1 | 12/2016 | Guthrie et al. | |
| 2016/0380534 A1 | 12/2016 | Harshey et al. | |
| 2018/0062530 A1 | 3/2018 | Kong et al. | |
| 2019/0379290 A1 | 12/2019 | Takada et al. | |
| 2020/0112249 A1 | 4/2020 | Oettinger et al. | |
| 2021/0099080 A1 | 4/2021 | Chen | |
| 2022/0069702 A1 | 3/2022 | Lawrence et al. | |
| 2022/0294343 A1 | 9/2022 | Peretz | |
| 2023/0213954 A1 | 7/2023 | Guthrie et al. | |
| 2023/0216411 A1 | 7/2023 | Grisamore et al. | |
| 2023/0216791 A1 | 7/2023 | Grisamore et al. | |
| 2023/0327548 A1 | 10/2023 | Yun et al. | |
| 2025/0038648 A1 | 1/2025 | Hora et al. | |

OTHER PUBLICATIONS

Qiu et al., "Digital Average Current-Mode Control of PWM DC-DC Converters Without Current Sensors", IEEE Transactions on Industrial Electronics, vol. 57, No. 5, May 2010, pp. 1670-1677.

Ferdowsi M, "An Estimative Current Mode Controller for DC-DC Converters Operating in Continuous Conduction Mode", Proceedings of the 21st Annual IEEE Applied Power Electronics Conference and Exposition, Mar. 1, 2006, pp. 1133-1136.

Channappanavar et al., "An Inductor Current Estimator for Digitally Controlled Synchronous Buck Converter", IEEE Transactions on Power Electronics, vol. 34, No. 5, May 2019, pp. 4883-4894.

Kugelstadt T. "Auto-zero amplifiers ease the design of high-precision circuits", Analog Applications Journal, Second Quarter, 2005, pp. 19-27.

DE Exam Report dated Nov. 19, 2025 issued in DE Appl 102023212640.0.

DE First Exam Report dated Oct. 15, 2025 issued in DE Appl 102023212638.9.

DE First Exam Report dated Oct. 20, 2025 issued in DE Appl 102023212639.7.

* cited by examiner

CORRECTION CIRCUIT

The present disclosure relates to a correction circuit for correcting one or more errors in a digitized current signal. In particular, the present disclosure relates to a correction circuit as may be applied to a switching converter.

BACKGROUND

FIG. 1 is a schematic of a digital buck converter 100 comprising a power stage 101, analog to digital converters (ADC) 102, 104, 106 and a controller 108. The power stage 101 comprises switches 110, 112, an inductor 114 and a capacitor 116. During operation, the switching converter receives an input voltage VIN and generates and output voltage VOUT.

While the power stage 101 and passive components (the inductor 114 and the capacitor 116) remain the same as for an analog buck converter, the ADC 102 converts the output voltage VOUT into a digital number. Optionally, the inductor current IL of the inductor 114, and the input voltage VIN can also be converted from analog to digital, depending on the digital control method.

We distinguish:

The switching frequency (FSW) of the buck converter 100, for example 2 MHz. FSW is equal to 1/TSW, where TSW is the switching period of the buck converter 100. FSW is the frequency of the power stage.

The processing frequency of the digital controller 108 (FS), for example about 100 MHz. FS is equal to 1/TS, where TS is the processing period of the controller 108. FS can also optionally be the sampling frequency of ADC 102.

Digital systems, such as the digital buck converter 100, may use a digital signal that is representative of a current flow through an energy storage element during operation. For example, a digitized current signal may be required by a controller for control of the switching operation of the digital switching converter.

In the present example, the digitized current signal is a digitized inductor current DIL, as provided by the ADC 104 converting an analog current signal indicative of the inductor current IL into a digital format. It will be appreciated components and methods other than the ADC 104 may be used to generate the digitized inductor current DIL. The digitized inductor current DIL may be generated using sensor based or sensor-less techniques. The digitized inductor current DIL is provided to the controller 108, which uses the information on the inductor current IL to control the switching operation of the power switches 110, 112. The dependency of the control scheme on the inductor current means such a system may be referred to as a current mode converter using current mode control.

For effective operation of the buck converter, or any other digital system that uses a digitized current signal during operation, it is desirable that the digitized current signal DIL accurately represents the analog current signal IL. With reference to the buck converter 100, it is desirable that the digitized inductor current DIL accurately represents the inductor current IL. It should be noted that the analog current signal and the inductor current may both be denoted by the variable "IL" to denote that the analog current signal is representative of the current flow through the inductor. It will be appreciated that the analog current signal IL may not be a current signal itself, but may, for example, be a voltage signal that is representative of a current signal.

SUMMARY

It is desirable to provide a system for improving the accuracy of a digitized current signal, when compared to existing methods.

According to a first aspect of the disclosure there is provided a correction circuit for correcting one or more errors in a digitized current signal, the digitized current signal being a digital representation of an analog current signal of a current flow through an energy storage element, wherein the correction circuit is configured to correct the one or more errors in the digitized current signal by comparing the digitized current signal to the analog current signal, and correcting the digitized current signal based on the outcome of the comparison.

Optionally, the digitized current signal is provided by a current synthesizer.

Optionally, the correction circuit is configured to generate a correction signal that is dependent on the outcome of the comparison, and provide the correction signal to the current synthesizer, the correction signal being suitable for correcting the one or more errors in the digitized current signal when received by the current synthesizer, thereby correcting the digitized current signal based on the outcome of the comparison.

Optionally, the correction circuit is configured to correct an offset error between the digitized current signal and the analog current signal.

Optionally, the correction circuit is configured to compare the digitized current signal to the analog current signal to determine the offset error, and correct the digitized current signal using the determined offset error.

Optionally, the correction circuit is configured to determine the offset error by detecting a first time step when the digitized current signal crosses a first digital threshold, detecting a second time step when the analog current signal crosses a first analog threshold, calculating a first duration between the first time step and the second time step, determining a first slope of at least one of the digitized current signal and the analog current signal, multiplying the first duration by the first slope, thereby determining the offset error.

Optionally, the first digital threshold is approximately equal to a digitized first analog threshold.

Optionally, the correction circuit comprises a comparator configured to provide an output that is indicative of analog current signal crossing the first analog threshold, the output being used to determine the second time step.

Optionally, the correction circuit is configured to correct a relative slope error between the digitized current signal and the analog current signal.

Optionally, the correction circuit is configured to compare the digitized current signal to the analog current signal to determine the relative slope error, and correct the digitized current signal using the relative slope error, as determined.

Optionally, the correction circuit is configured to determine the relative slope error by detecting a first time step when the digitized current signal crosses a first digital threshold, detecting a second time step when the analog current signal crosses a first analog threshold, detecting a third time step when the digitized current signal crosses a second digital threshold, detecting a fourth time step when the analog current signal crosses a second analog threshold, calculating a first digital slope delay between the first time step and the third time step, calculating a first analog slope delay between the second time step and the fourth time step, dividing the first analog slope delay by the first digital slope delay to calculate a first delay parameter, then subtracting one from the first delay parameter, thereby determining the relative slope error.

Optionally, the correction circuit is configured to correct a relative slope error between the digitized current signal and the analog current signal.

Optionally, the correction circuit is configured to correct the relative slope error prior to correcting the offset error.

Optionally, the correction circuit is configured to compare the digitized current signal to the analog current signal to determine the relative slope error and the offset error, and correct the digitized current signal using the relative slope error and offset error, as determined.

Optionally, the correction circuit is configured to determine the relative slope error by detecting a first time step when the digitized current signal crosses a first digital threshold, detecting a second time step when the analog current signal crosses a first analog threshold, detecting a third time step when the digitized current signal crosses a second digital threshold, detecting a fourth time step when the analog current signal crosses a second analog threshold, calculating a first digital slope delay between the first time step and the third time step, calculating a first analog slope delay between the second time step and the fourth time step, dividing the first analog slope delay by the first digital slope delay to calculate a first delay parameter, then subtracting one from the first delay parameter, thereby determining the relative slope error.

Optionally, the correction circuit is configured to determine the offset error by calculating a first duration between the first time step and the second time step, determining a first slope of the analog current signal by calculating an analog threshold difference by subtracting the second analog threshold from the first analog threshold, and dividing the analog threshold difference by the first analog slope delay, and multiplying the first slope of the analog current signal by the first duration, thereby determining the offset error.

Optionally, the correction circuit is configured to correct one or more errors in the digitized current signal during operation of a switching converter comprising the energy storage element.

Optionally, the switching converter is one of a buck converter, a boost converter and a buck-boost converter.

Optionally, the energy storage element comprises an inductor.

Optionally, the correction circuit is configured to correct the one or more errors in the digitized current signal two or more times during operation of the switching converter, or in response to an external signal, or in response to one of the one or more errors exceeding a threshold value, or in response to a mode change of the switching converter, or in response to a transient.

Optionally, the correction circuit is configured to correct the one or more errors in the digitized current signal periodically or non-periodically during operation of the switching converter.

According to a second aspect of the disclosure there is provided a method of correcting one or more errors in a digitized current signal using a correction circuit, the digitized current signal being a digital representation of an analog current signal of a current flow through an energy storage element, the method comprising comparing the digitized current signal to the analog current signal, and correcting the digitized current signal based on the outcome of the comparison.

It will be appreciated that the method of the second aspect may include features set out in the first aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 1:
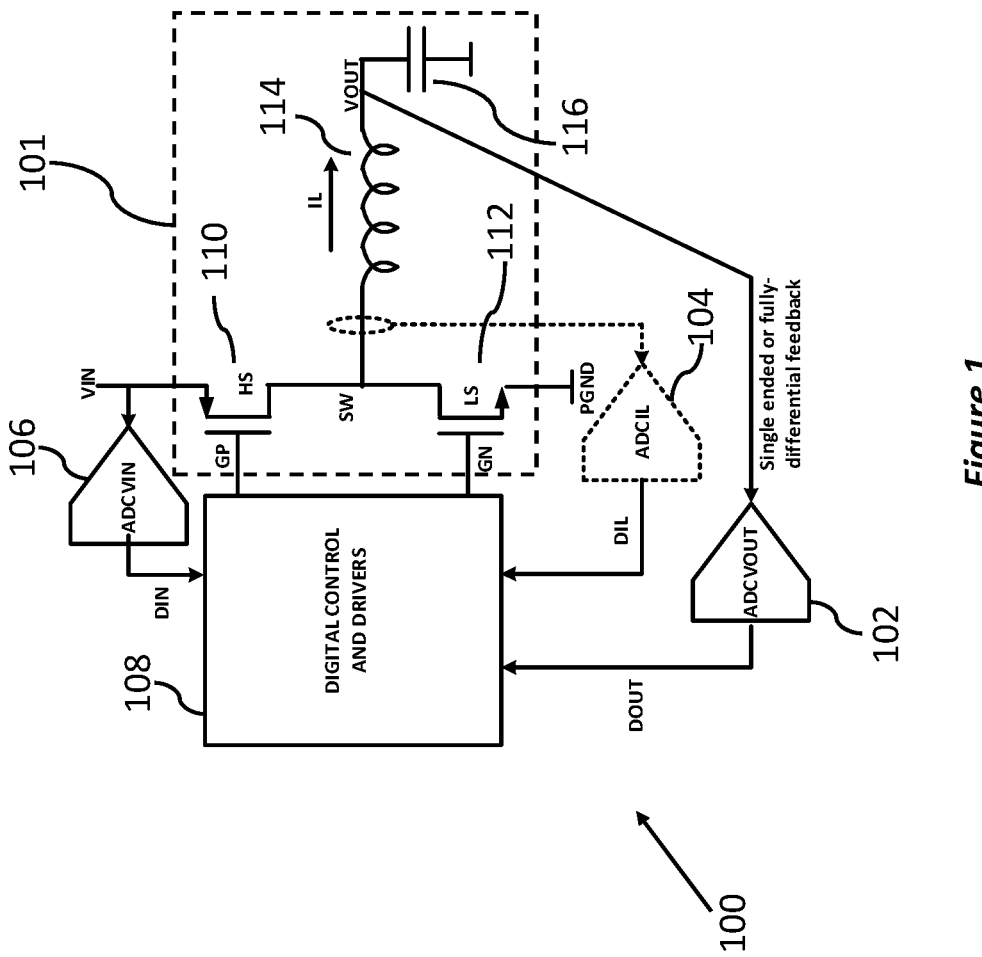
FIG. 1 is a schematic of a digital buck converter.
Figure 2:
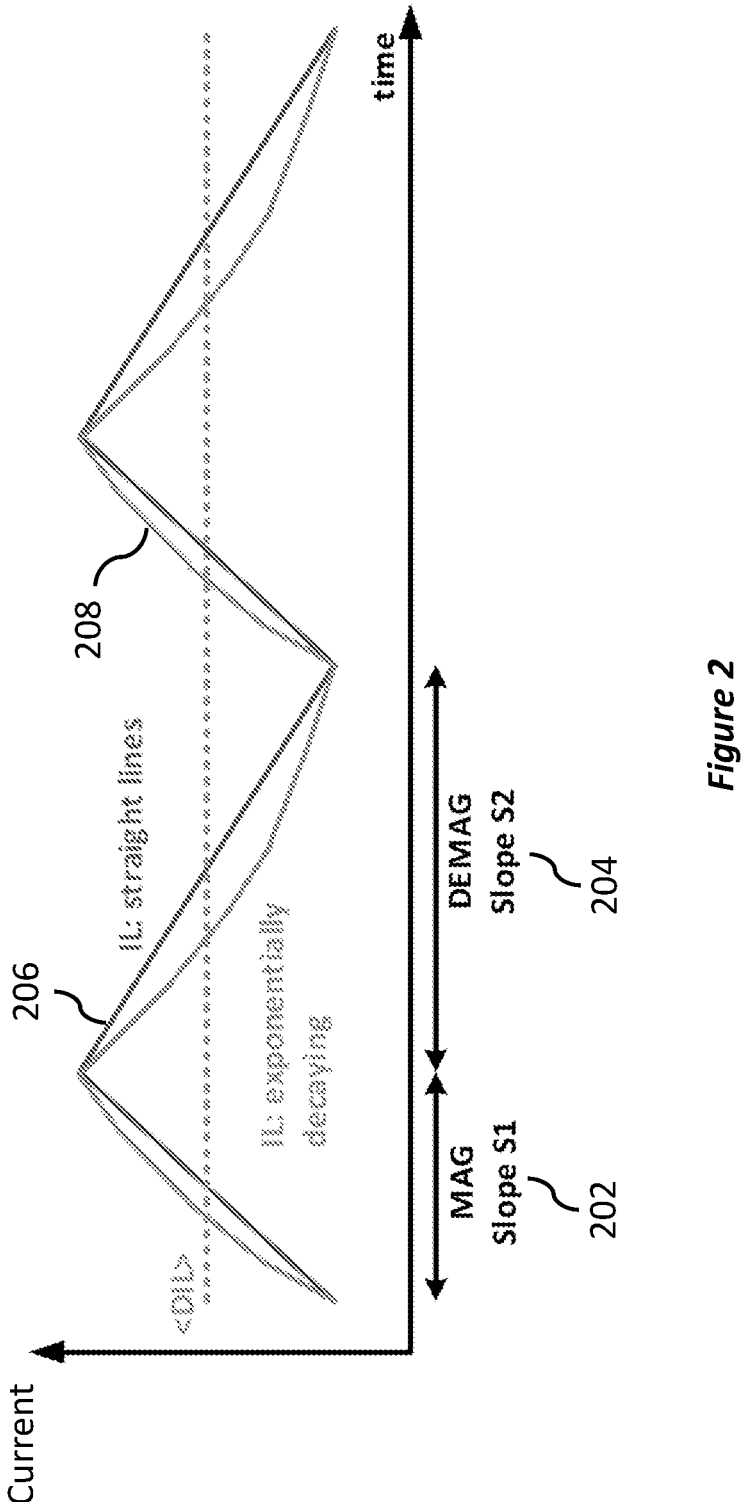
FIG. 2 is a graph of the inductor current varying with time during operation of the buck converter of FIG. 1.

FIG. 2 is a graph of the inductor current IL varying with time during operation of the buck converter 100 of FIG. 1. During operation, the inductor 114 switches between coupling to the input voltage VIN via the switch 110 (the magnetization phase, labelled by numeral 202) and coupling to ground PGND via the switch 112 (the demagnetization phase, labelled by numeral 204).

The graph shows a first trace 206 showing an idealised inductor current. The inductor current IL may have an idealised shape that made of straight lines and is as is used in U.S. Pat. No. 9,419,627B2 and U.S. Pat. No. 9,667, 260B2. The graph also shows a second trace 208 showing a more realistic current profile where the slope of each phase has a non-linear shape (exponential decay for the falling slope).

Note that the timing diagrams are continuous time and continuous data to aid in the clarity of the explanation.

For some switching converters, a straight-line approximation of the inductor current IL can be sufficient for an effective control scheme. However, having a more accurate, non-linear, digitized inductor current DIL waveform is desirable as it can ensure more precise current control. Furthermore, a digitized inductor current DIL having improved accuracy can be used for additional applications beyond just regulation, such as for over current protection.

There are several suitable methods for the generation of the digitized inductor current DIL, as will be known to the skilled person. For example, the digitized inductor current DIL may be generated using the ADC 104 as described in relation to FIG. 1, or may be generated using a current synthesizer. The following description relates to the generation of the digitized inductor current DIL using a current synthesizer.

In the discrete time domain (so clocked at TS, which is the processing period of the controller 108), the digitized inductor current DIL during the magnetization phase, may be represented as follows:

$$DIL\,[n] = \qquad\qquad\qquad\qquad\qquad\qquad\qquad (1)$$
$$DIL\,[n-1] - \frac{TS}{L} \times R_{MAG} \cdot DIL\,[n-1] + \frac{TS}{L} \times (DIN - DOUT)$$

The digitized inductor current DIL during the demagnetization phase may be represented as follows:

$$DIL\,[n] = DIL\,[n-1] - \frac{TS}{L} \times R_{DEMAG} \cdot DIL\,[n-1] - \frac{TS}{L} \times (DOUT) \qquad (2)$$

The variable terms $R_{MAG}$ and $R_{DEMAG}$ are thus the non-linear corrections to ideal slopes for the magnetization phase, and the demagnetization phase, respectively. L is the inductance of the inductor 114, DIN is a digital input voltage signal, DOUT is a digital output voltage signal, and n is an integer.

$$R_{MAG} = DCR + RHS \qquad (3)$$

$$R_{DEMAG} = DCR + RLS \qquad (4)$$

where RHS is the on-resistance of the transistor 110, RLS is the on-resistance of the transistor 112 and DCR is the series resistance of the inductor 114.

It will be appreciated that the digitized inductor current DIL may have the profile shown by the trace 206 by using a straight line approximation by setting $R_{MAG}=R_{DEMAG}=0$ for equations (1) and (2).

A current synthesiser may be used to generate the digitized inductor current DIL using equations (1) to (4).

By way of example, and with reference to equations (1)-(4), it is evident that achieving an accurate digitized inductor current DIL depends on accurate values for the parameters used in the equations (for example L, RHS, RLS, DCR, DIN, DOUT). Other sources of error may include, but are not limited to:

Driver speed.

Dead-times between LS and HS switch conduction

Temperature variations of resistances

Inductor aging

Temperature-induced errors tend to be slowly varying. Errors in digitized inductor current DIL related to driver speed change with a time constant of L/R, where R is as follows:

$$R = D \cdot (RHS + DCR) + (1 - D) \cdot (RLS + DCR) \qquad (5)$$

where D is the duty cycle of the buck converter 100. Errors related to the dead-zone can occur withing one clock cycle. The accumulations of these errors can introduce large discrepancies between the digitized inductor current DIL and the IL (up to 1.3 A observed in simulations).

Figure 3:
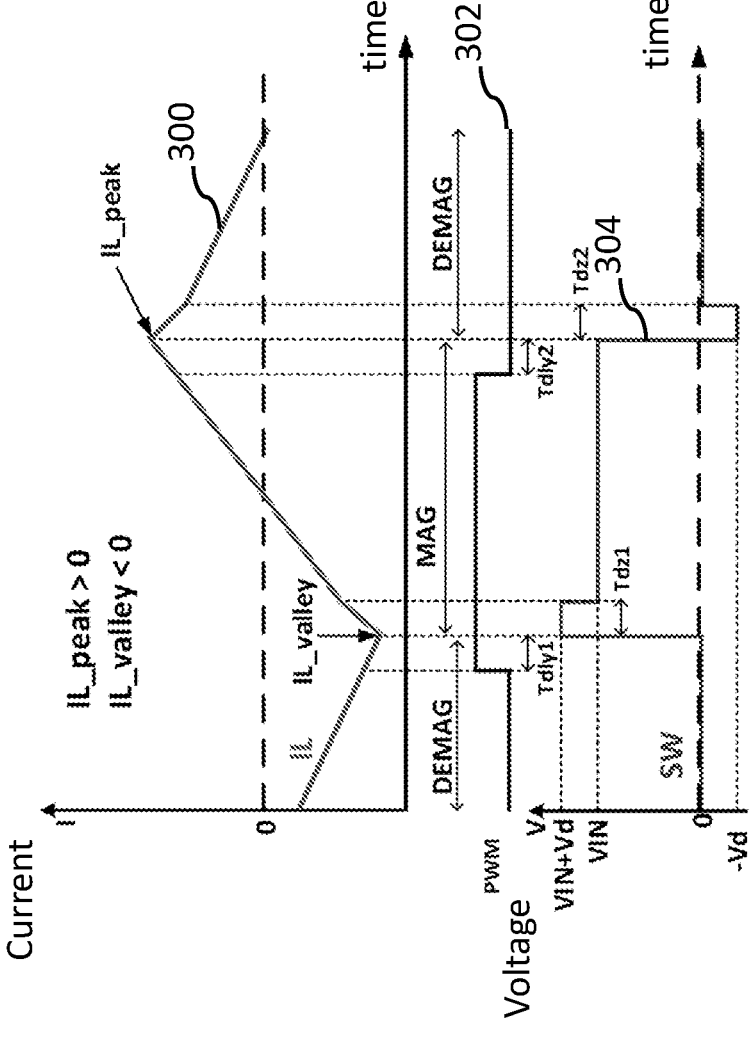
FIG. 3 is a timing graph showing an example of how parameters relating to the operation of the buck converter vary with time during operation.

FIG. 3 is a timing graph showing an example of how parameters relating to the operation of the buck converter 100 vary with time during operation. A trace 300 shows the inductor current IL as it varies with time; a trace 302 shows the pulse width modulation (PWM) signal varying with time; and a trace 304 showing a voltage at the switching node SW. The PWM signal is used to control the switching operation of the buck converter 100, and the use of PWM in this context will be well known to the skilled person.

The timing graph of FIG. 3 shows a simplified and exaggerated view of the driver delay (Tdly1, Tdly2) and dead-zones (Tdz1, Tdz2) for a particular inductor current IL.

In this case, there is a delay between rising edge of PWM signal and the power switches reacting to this change (Tdly1). A similar (but not equal) delay is present on the falling edge of the PWM signal (Tdly2).

From an analogue point of view, we consider MAG, denoting the magnetization phase, to be the portion of time during which the inductor current IL is rising. The inductor current IL is close to zero.

From equations (1) and (2), it can be seen that the expressions during the magnetization phase differs from that during demagnetization phase therefore it is desirable to accurately know the timing of the transition between the phases. If the PWM signal is used to identify the time of the transition it is evident that that will introduce errors due to the Tdly1 and Tdly2.

Furthermore, the different slope of the inductor current IL during the dead-zones, Tdz1 and Tdz2, compared to the slope during the rest of the magnetization phase (where SW=VIN) is not taken into account in the equations (1) and (2). The errors mentioned above are highly dependent on the IL, VIN, VOUT and Temperature.

Figure 4:
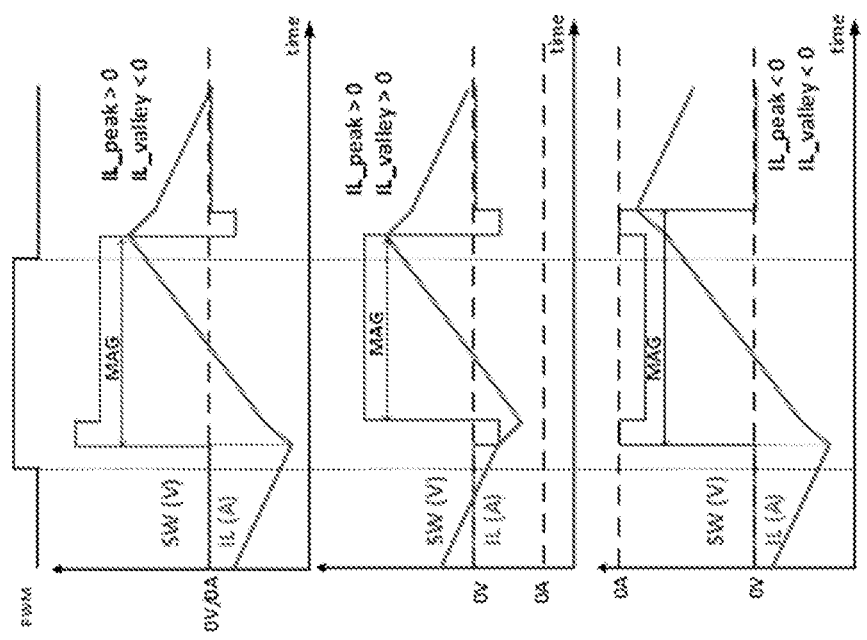
FIG. 4 shows timing graphs showing examples of how parameters relating to the operation of the buck converter vary with time during operation, and for different inductor current values.

FIG. 4 shows timing graphs showing examples of how parameters relating to the operation of the buck converter 100 vary with time during operation, and for different inductor current IL values.

FIG. 4 shows how the effective MAG duration changes with the inductor current IL (for a fixed demanded PWM duration). More precisely, the effective MAG duration changes depending on the valley current (IL_valley) and the peak current (IL_peak) of the inductor current IL at the end of MAG and end of DEMAG stages. This is due to the current conduction through the freewheeling body diode which is dependent on the polarity of the inductor current IL. The change of switching node SW voltage depends on the polarity of the inductor current IL at end of DEMAG and end of MAG.

It is possible to correct for these errors (and more) in a feed-forward fashion which can reduce the magnitude of (DIL-IL) error. However, even small residual errors can be integrated and ultimately lead to increasing discrepancies over time.

Figure 5:
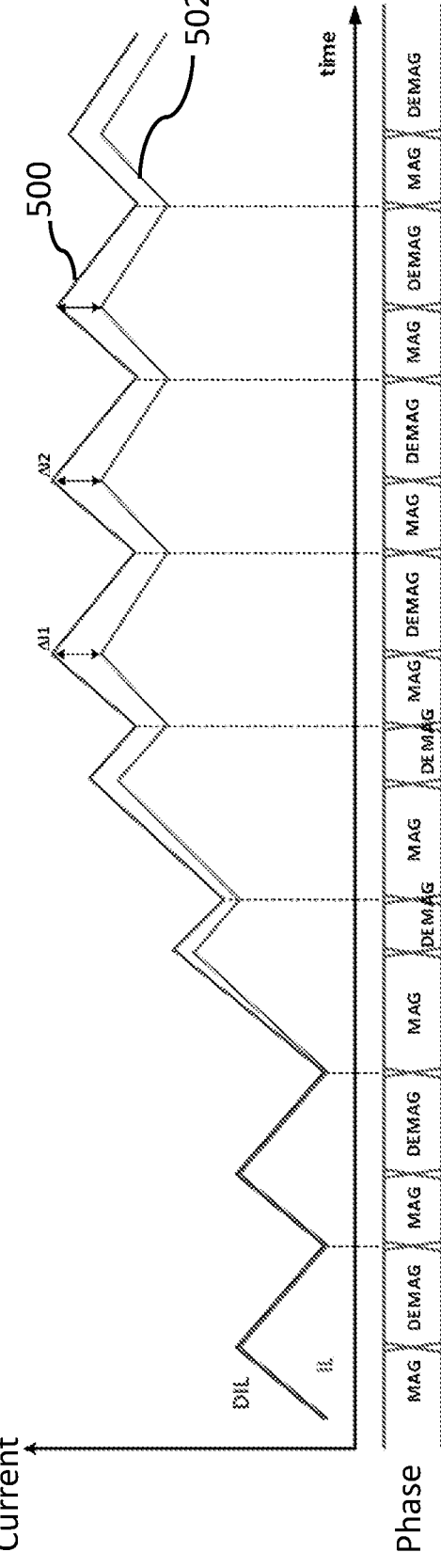
FIG. 5 is a timing graph showing representative waveforms of the digital inductor current and the inductor current IL as a result of a load transient during operation of the buck converter.

FIG. 5 is a timing graph showing representative waveforms of the digital inductor current DIL (a trace 500) and the inductor current IL (a trace 502) as a result of a load transient during operation of the buck converter 100.

After the transient, there is a mismatch between the waveforms. For single phase converters, the errors between the DIL and IL may still permit functioning of the system, but are nonetheless undesirable due to a degradation of performance under transient loads and an unsuitability of the digitized inductor current DIL for use in applications such as overcurrent protection. For multiphase converters, mismatch between the phase currents is highly undesirable as they can degrade transient performance and efficiency. As the DIL to IL errors are independent of each other, the effective mismatch between the inductor current IL of two different converter phases can be doubled with respect to the DIL to IL mismatch of a single phase converter.

It is desirable the digitized inductor current DIL has the following properties:

Accurate average value compared to IL
Accurate ripple magnitude compared to IL
Rapid correction for any introduced errors.
No divergence over time with respect to IL
Similar non-linear shape as IL FIG. 6(a) is a schematic of a correction circuit 600 for correcting one or more errors in a digitized current signal DIL, in accordance with a first embodiment of the present disclosure. The digitized current signal DIL is a digital representation of an analog current signal IL of a current flow through an energy storage element 602.

It should be noted that the variables "IL" and "DIL" are used for consistency with the previous description where the energy storage element comprises an inductor that is part of a buck converter. In the present embodiment, the energy storage element 602 is considered generally. In specific embodiments, the energy storage element 602 may comprise an inductor, or a different circuit component in accordance with the understanding of the skilled person.

During operation, the correction circuit 600 corrects the one or more errors in the digitized current signal DIL by comparing the digitized current signal DIL to the analog current signal IL and then correcting the digitized current signal DIL based on the outcome of the comparison.

The digitized current signal DIL may be provided by a current synthesizer 612. The correction circuit 600 may be configured to generate a correction signal 601 that is dependent on the outcome of the comparison, and to provide the correction signal 601 to the current synthesizer 612.

The correction signal 601 is a signal that is suitable for correcting the one or more errors in the digitized current signal DIL when received by the current synthesizer 612. Therefore, during operation, the current synthesizer 612 uses the correction signal 601 to correct the digitized current signal DIL based on the outcome of the comparison.

The correction signal 601 may include information relating to a mismatch between the two signals IL, DIL, as will be the case if the digitized current signal DIL is not an accurate digital representation of the analog current signal IL. The current synthesizer 612 may then use the information provided by the comparison signal 601 to adjust, or otherwise correct, the digitized current signal DIL to decrease the mismatch and ensure that it more accurately represents the analog current signal IL digitally.

If the digitized current signal DIL is already a sufficiently accurate representation of the analog current signal IL, as may be defined by a threshold, then the mismatch as indicated by the correction signal 601 may be suitably small such that no correction is required to be applied by the current synthesiser 612.

Figure 6B:
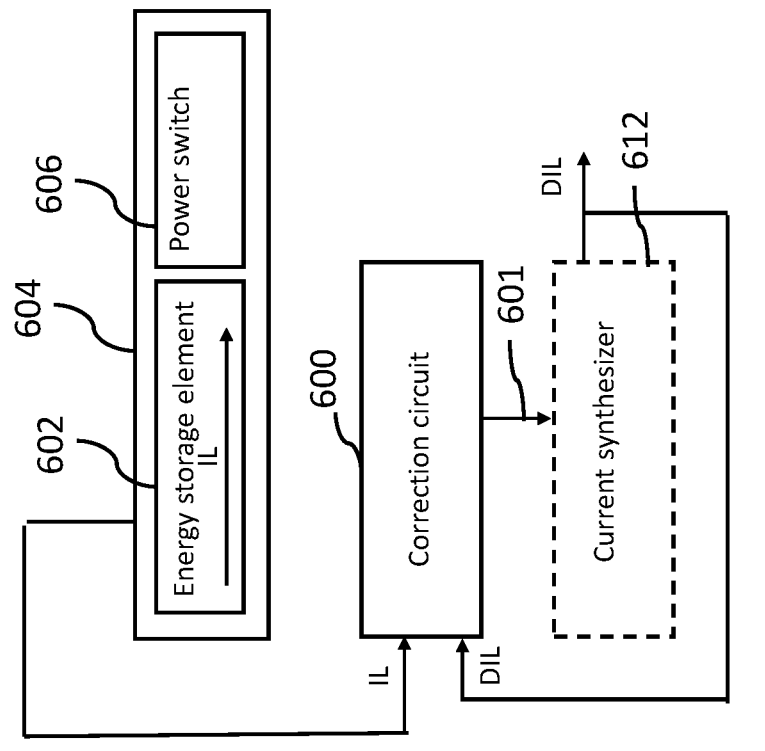
FIG. 6(b) is a schematic of the correction circuit and an energy storage element in accordance with a second embodiment of the present disclosure.
Figure 6A:
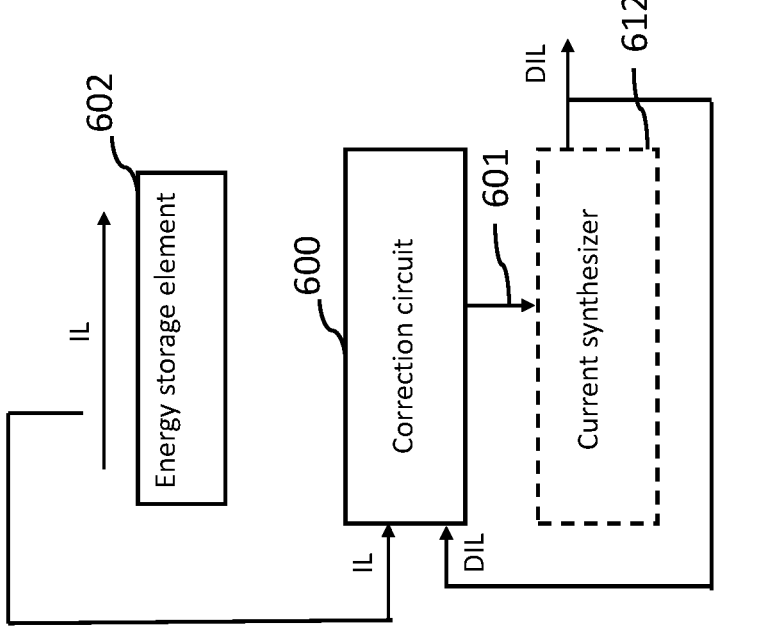
FIG. 6(a) is a schematic of a correction circuit in accordance with a first embodiment of the present disclosure.

FIG. 6(b) is a schematic of the correction circuit 600 and the energy storage element 602 in accordance with a second embodiment of the present disclosure. In the present embodiment, the energy storage element 602 is a component of a switching converter 604 which comprises at least one power switch 606.

In the present embodiment, the correction circuit 600 corrects the one or more errors in the digitized current signal DIL during operation of the switching converter 604. The switching converter 604 may be a buck converter, a boost converter, or a buck-boost converter.

The correction circuit 600 may correct the one or more errors in the digitized current signal DIL on one or more occasions. In a specific embodiment, the correction may be undertaken periodically or non-periodically. In a further embodiment, the correction may be undertaken in response to an external signal; in response to at least one of the errors exceeding a threshold value; in response to a transient; or in response to a mode change of the switching converter. In further embodiments, the correction may be applied based on one or more of the above conditions.

It will be appreciated that the correction process may be applied more than once during operation of the overall system comprising the energy storage element 602. This may be necessary if an event occurs that results in an increase in the mismatch between the digitized current signal DIL and the analog current signal IL, such as a transient.

In a specific embodiment, the correction circuit 600 may be configured to correct an offset error between the digitized current signal DIL and the analog current signal IL.

Figure 7:
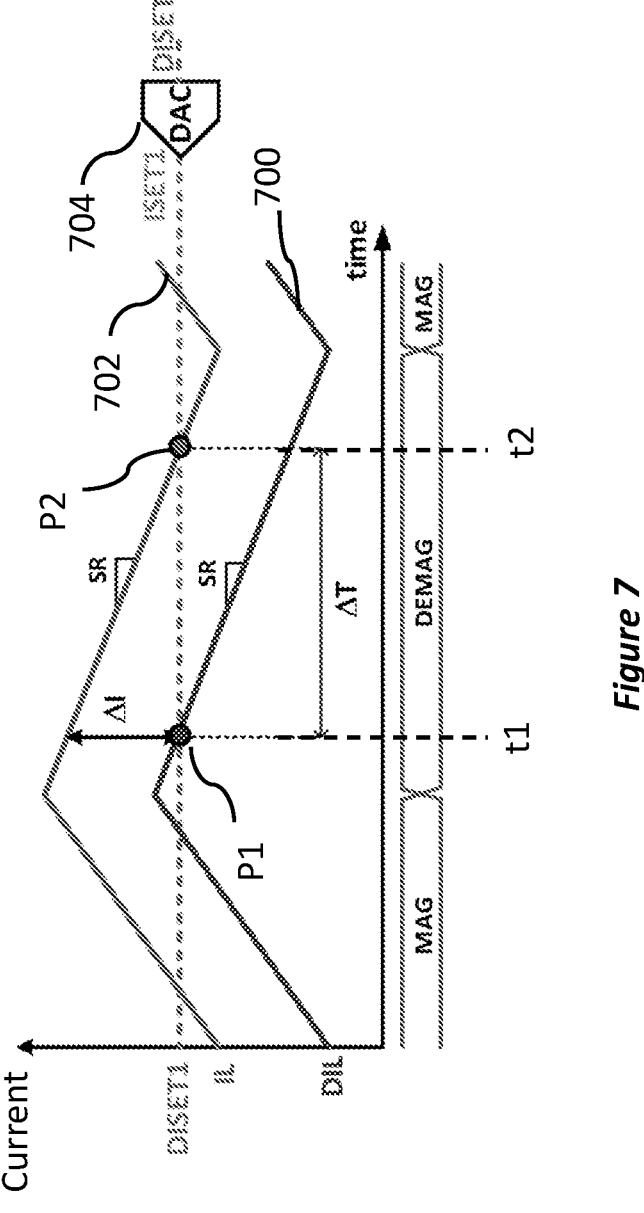
FIG. 7 is a timing graph showing the digitized current signal and the analog current signal during operation of an example embodiment of the present disclosure, for example, in relation to the apparatus presented in FIG. 6(a)

FIG. 7 is a timing graph showing the digitized current signal DIL and the analog current signal IL during operation of an example embodiment of the present disclosure, for example, in relation to the apparatus presented in FIG. 6(a). In the present example, there is an offset error (denoted by $\Delta I$) between the digitized current signal DIL (a trace 700) and the analog current signal IL (a trace 702).

As discussed previously, continuous time and value representations for the digitized current signal DIL are used to aid the clarity of the explanation. However, in reality the digitized current signal DIL comprises values that vary with discrete time steps.

The following description assumes that the energy storage element 602 is an inductor that is used as part of a buck converter. However, it will be appreciated that the concept is applicable to other switching converter topologies including, but not limited to boost converters, buck-boost converters and multi-switch converters, in accordance with the understanding of the skilled person.

With reference to FIG. 7, the waveforms IL, DIL are phase aligned because the digitized inductor current DIL is a digital representation of the analog inductor current IL. Furthermore, the slew rates of the digitized inductor current DIL and the analog inductor current IL are equal during the demangetization phase (denoted by "DEMAG"), which is also assumed to be true during the magnetization phase (denoted by "MAG"). The slew rates are denoted by "SR" and have units of amps per unit time (for example A/s, where "A" denotes amperes and "s" denotes seconds). The slew rates may also be referred to as "slopes".

The offset error ΔI indicates a mismatch between the average levels of the digitized current signal DIL and the analog current signal IL, which may be referred to as their direct current (DC) levels. For an accurate representation of the analog current signal IL by the digitized current signal DIL, the offset error ΔI should be approximately equal to zero.

In relation to a specific embodiment of the present disclosure, to correct for the offset error ΔI, the correction circuit 600 compares the digitized current signal DIL to the analog current signal IL to determine the offset error ΔI. Using this information the correction circuit 600 then applies a correction to the digitized current signal DIL to reduce the offset error ΔI to approximately zero, thereby correcting the digitized current signal DIL.

In the present example, a digital threshold DISET1 has its analog representation ISET1 obtained via a DAC 704 receiving the threshold DISET1 to generate the analog threshold ISET1 in FIG. 7. The digital threshold DISET1 is approximately equal to the analog threshold ISET1 because the two signals represent the same quantity in different domains. Therefore, the thresholds DISET1, ISET1 are aligned in FIG. 7.

The digital threshold DISET1 may be an arbitrary threshold between the peak of the digitized inductor current DIL and valley of the digitized inductor current DIL), with the analog threshold ISET1 being similarly defined in relation to the analog inductor current IL.

A point P1 is obtained from the digitized inductor current DIL (a digital signal) crossing a digital threshold DISET1. It will be appreciated that this is a digital comparison.

A point P2 is obtained from the analog inductor current IL (a real, analogue signal) crossing a real threshold ISET1. This an analogue comparison will result in a real event (such as a comparator output).

In a specific embodiment, the correction circuit 600 may comprises a comparator (not shown) configured to provide an output that is indicative of the analog current signal IL crossing the threshold ISET1, with the output being used to determine the time step t2.

Using the two comparison points P1, P2 the offset ΔI between the DIL and IL waveforms can be determined.

In a specific embodiment, the offset error ΔI is determined by the correction circuit 600, initially, detecting a time step t1 at the point P1 when the digitized current signal DIL crosses a digital threshold DISET1; detecting a time step t2 at the point P2 when the analog current signal IL crosses an analog threshold ISET1; and then calculating a duration ΔT between the two time steps. ΔT may be calculated by subtraction the time step t2 from the time step t1.

Furthermore, the correction circuit 600 is configured to determine a slope SR of one of the signals IL, DIL. In the present embodiment, the slopes are equal and therefore the slope SR can be determined from either of the signals DIL, IL.

During operation, the correction circuit 600 then determines the offset error ΔI using the following relationship between the slope SR and the duration ΔT.

$$\Delta I = SR \cdot \Delta T \qquad (6)$$

If the SR and ΔT can be measured (or are known otherwise), the offset between the waveforms can be corrected. If ΔI=0, the two waveforms, DIL and IL, are aligned, meaning the DIL representation of IL is accurate.

If the waveforms IL, DIL are spaced apart such that the analog inductor current IL does not cross the threshold ISET1, an accurate value for the offset can be determined by first applying a coarse correction in an attempt to bring the two waveforms DIL, IL close enough for a measurement to be taken.

In a further specific embodiment, the correction circuit 600 may be configured to correct a relative slope error between the digitized current signal DIL and the analog current signal IL.

Figure 8:
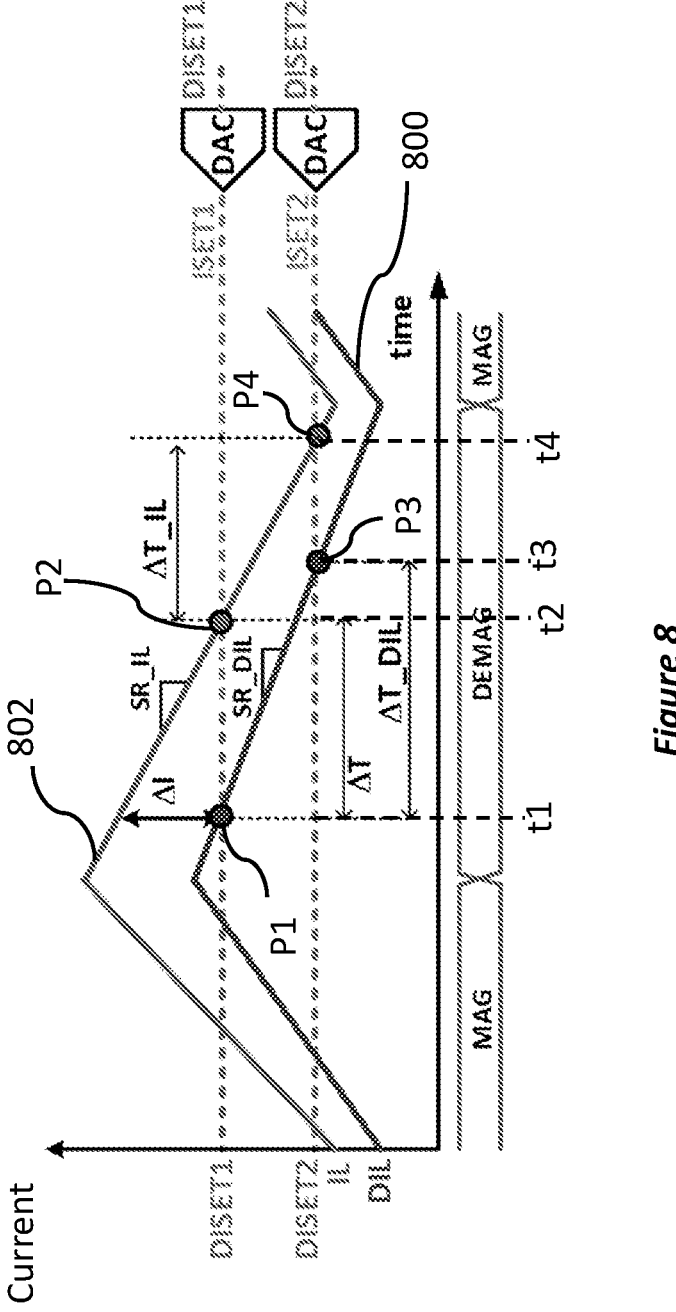
FIG. 8 is a timing graph showing the digitized current signal and the analog current signal during operation of an example embodiment of the present disclosure, for example, in relation to the apparatus presented in FIG. 6(a)

FIG. 8 is a timing graph showing the digitized current signal DIL and the analog current signal IL during operation of an example embodiment of the present disclosure, for example, in relation to the apparatus presented in FIG. 6(*a*). In the present example, there is a relative slope error between the digitized current signal DIL (a trace 800) and the analog current signal IL (a trace 802).

As for FIG. 7, FIG. 8 shows the digitized current signal DIL with a continuous time representation, and the following example will be described in relation to a buck converter.

In the present example, the slopes are unequal. The slope of the digitized inductor current DIL is labelled "SR_DIL" and the slope of the analog inductor current IL is labelled "SR_IL".

In relation to a specific embodiment of the present disclosure, to correct for the relative slope error, the correction circuit compares the signals IL, DIL to determine the relative slope error SR_ERR. Using this information the correction circuit 600 then applies a correction to the digitized current signal DIL to reduce the relative slope error SR_ERR to be approximately equal to zero, thereby correcting the digitized current signal DIL.

In the present example the threshold ISET1 and DISET1 are as described in relation to FIG. 7. In the present example, a digital threshold ISET2 has its analog representations ISET2 obtained via a DAC 804 receiving the threshold DISET2 to generate the analog threshold ISET2 in FIG. 8. The digital threshold DISET2 is approximately equal to the analog threshold ISET2 because the two signals represent the same quantity in different domains. Therefore, the thresholds DISET2, ISET2 are aligned in FIG. 8.

A point P3 is obtained from the digitized inductor current DIL (a digital signal) crossing a digital threshold DISET2. It will be appreciated that this is a digital comparison.

A point P4 is obtained from the analog inductor current IL (a real, analogue signal) crossing a real threshold ISET2. This an analogue comparison will result in a real event (such as a comparator output).

In a specific embodiment, the relative slope error SR_ERR is determined by the correction circuit 600, detecting the time steps t1 and t2 as described in relation to FIG. 7; detecting a time step t3 at the point P3 when the digitized current signal DIL crosses the digital threshold DISET2; detecting a time step t4 at the point P4 when the analog current signal IL crosses the analog threshold ISET2; calculating a digital slope delay $\Delta T\_DIL$ between the time steps t1, t3; calculating an analog slope delay $\Delta T\_IL$ between the time steps t2, t4; and dividing the slope delays $\Delta T\_DIL$, $\Delta T\_IL$ to calculate the relative slope error SR_ERR.

We may define the following equations relating to the thresholds:

$$\Delta ISET = ISET1 - ISET2 \tag{7}$$

$$\Delta DISET = DISET1 - DISET2 \tag{8}$$

As described previously, the three delay measurements $\Delta T$, $\Delta T\_DIL$, $\Delta T\_DIL$ can be derived from the results of the digital comparisons of the digitized inductor current DIL with the digital thresholds DISET1, DISET and the analog comparisons of the analog inductor current IL with the analog thresholds ISET1, ISET2.

The relative slope error SR_ERR may be calculated as follows:

$$SR\_ERR = \frac{SR\_DIL - SR\_IL}{SR\_IL} = \frac{\Delta T\_IL}{\Delta T\_DIL} - 1 \tag{9}$$

where SR_DIL is the slope of the digitized inductor current DIL, and SR_IL is the slope of the analog inductor current IL.

The value of relative slew rates of the analog inductor current IL and the digitized inductor current DIL is provided by the relative slope error SR_ERR and can be used to apply a correction to the digitized inductor current DIL signal to align its slope SR_DIL with the slope of the analog inductor current SR_IL.

There are several methods available to adjust the slope SR_DIL, as will be clear to the skilled person. For example, one option, and with reference to equations (1) and (2) is to change the L parameter value used in the expression used to compute DIL[n]. L denotes the inductance of the inductor of the energy storage element 602.

In a further embodiment, the correction circuit 600 may be configured to correct the relative slope error and the offset error. For example, the correction circuit 600 may be configured to compare the digitized current signal DIL to the analog current signal IL to determine the offset and relative slope errors, and then correct the digitized current signal DIL based on the errors, as determined.

In a specific embodiment, the expressions (1) and (2) can be modified as follows to allow the corrections for error and slope to be accounted for in the generation of the digitized inductor current DIL[n]:

$$DIL[n] = DIL[n-1] + \frac{TS}{L \times SR\_ERR} \times (DIN - DOUT) - \tag{10}$$

$$\frac{TS}{L \times SR\_ERR} \times R_{MAG} \cdot DIL[n-1] - \Delta I$$

-continued $$DIL[n] = DIL[n-1] + \frac{TS}{L \times SR\_ERR} \times (DIN - DOUT)$$

$$DIL[n] = DIL[n-1] - \frac{TS}{L \times SR\_ERR} \times (DOUT) - \tag{11}$$

$$\frac{TS}{L \times SR\_ERR} \times R_{DEMAG} \cdot DIL[n-1] - \Delta I$$

$$DIL[n] = DIL[n-1] - \frac{TS}{L \times SR\_ERR} \times (DOUT)$$

As the expressions provided by equations (10) and (11) are recursive (dependent on the previous value), the offset correction need to be done only once after being calculated (to avoid integrating that correction).

Once the offset error is corrected, all future DIL[n] will become corrected. The relative slope error term, SR_ERR, can (and should) be used for every subsequent DIL[n] value calculation.

The offset error may determined as described in relation to FIG. 7 or FIG. 8. The relative slope error may be determined as described in relation to FIG. 8.

It is desirable that the slopes of the waveforms DIL, IL are equal during the demagnetization phase (DEMAG) and the magnetization phase (MAG), and prior to the correction of the offset error. Therefore, in a specific embodiment, the relative slope error may be corrected prior the correction of the offset error.

With reference to the labels provided on FIG. 8, the offset error may be determined using the following equation:

$$\Delta I = SR\_IL \cdot \Delta T \tag{12}$$

where:

$$SR\_IL = \frac{\Delta ISET}{\Delta T\_IL} \tag{13}$$

Equations (12) and (13) may be used to correct the offset error $\Delta I$ after the relative slope error has been corrected.

If there is a relative slope error present, it is preferable to apply the relative slope error correction prior to correcting the offset error. However, embodiments of the present disclosure may apply the offset error correction prior to the relative slope error correction. Further embodiment may apply the offset error correction only.

FIG. 9(*a*) is a timing graph of the digitized inductor current DIL during operation of an example embodiment of the present disclosure, for example in relation to the apparatus presented in FIG. 6(*a*). In the present example, the offset error has been corrected by aligning the digitized inductor current DIL (a trace 900) with the analog inductor current IL (a trace 902). In the present example, the digitized inductor current DIL has been aligned with the analog inductor current IL at the thresholds DISET1, ISET1.

FIG. 9(*b*) is a timing graph of the digitized inductor current DIL during operation of an example embodiment of the present disclosure, for example in relation to the apparatus presented in FIG. 6(*a*). In the present example, the offset error has been corrected by aligning the digitized inductor current DIL (a trace 904) with the analog inductor current IL (a trace 906). In the present example, the digitized inductor current DIL has been aligned with the analog inductor current IL at the thresholds DISET2, ISET2.

Figures 9A, 9B:
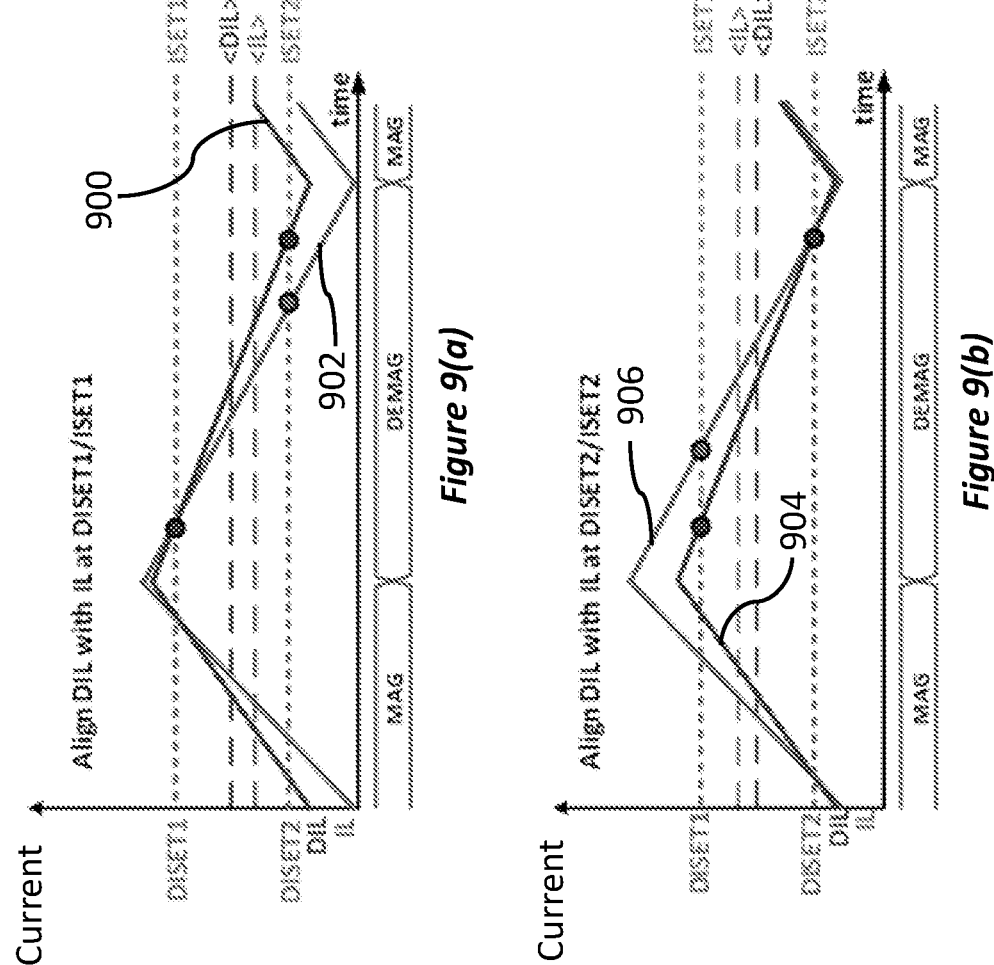
FIG. 9(a) is a timing graph of the digitized inductor current during operation of an example embodiment of the present disclosure, for example in relation to the apparatus presented in FIG. 6(a)
FIG. 9(b) is a timing graph of the digitized inductor current during operation of an example embodiment of the present disclosure, for example in relation to the apparatus presented in FIG. 6(a)

If the slopes of DIL (SR_DIL) and IL (SR_IL) are not identical and the offset is corrected, the two waveforms may be aligned at the ISET1, DISET1 threshold (as in FIG. 9(a)) or may be aligned at the ISET2, DISET2 threshold (as in FIG. 9(b)). However, the average digitized inductor current (which may be denoted by <DIL>) and the average analog inductor current (which may be denoted by <IL>) will be unequal.

Figure 10:
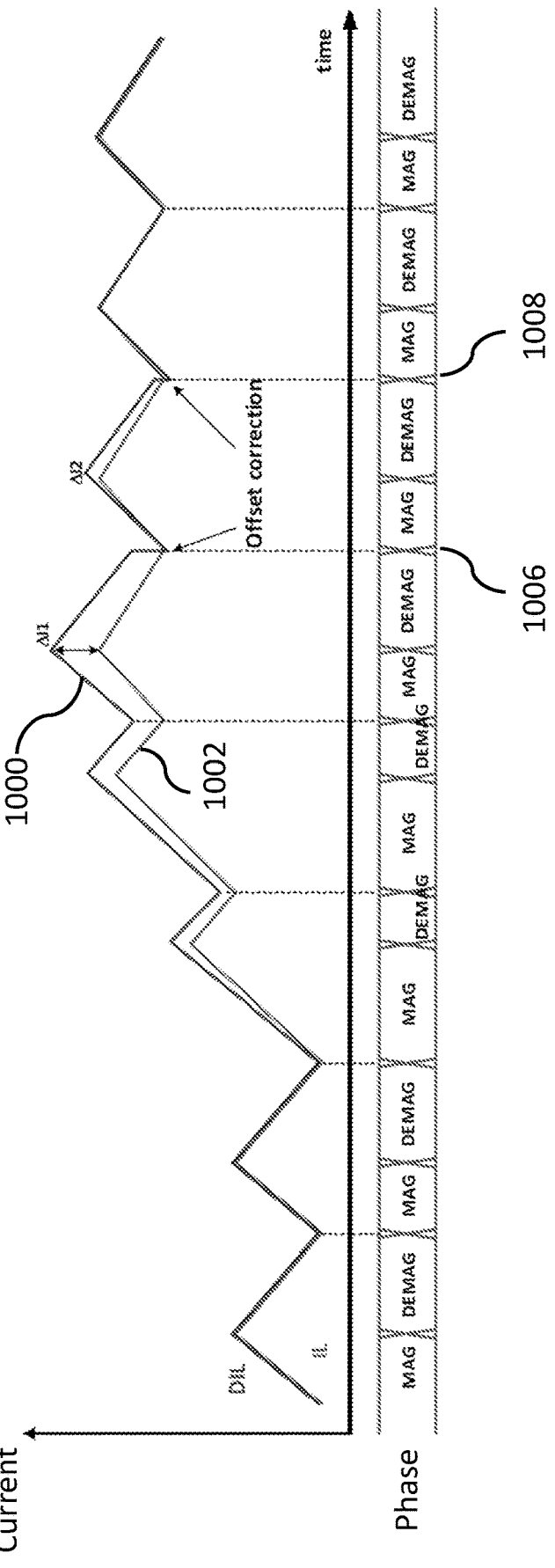
FIG. 10 is a timing graph showing the digitized current signal and the analog current signal during operation of an example embodiment of the present disclosure, for example, in relation to the apparatus presented in FIG. 6(a)

FIG. 10 is a timing graph showing the digitized current signal DIL and the analog current signal IL during operation of an example embodiment of the present disclosure, for example, in relation to the apparatus presented in FIG. 6(a), where the energy storage element 602 is an inductor that is part of a buck converter. The present example may use the offset error correction and relative slope error correction method as described in relation to FIG. 8.

In the present example, during operation the relative slope error and then the offset error is corrected by the correction circuit 600. there is shown a trace 1000 of the digitized inductor current DIL, and a trace 1002 of the analog inductor current. In the present example, the correction circuit 600 applies relative slope error correction and offset error correction at the end of two successive demagnetization phases at a time 1006 and a time 1008. After the time 1008, the signals DIL, IL can be seen to be aligned and therefore the correction circuit 600 has corrected the digitized current signal DIL. It will be appreciated that in a further embodiment, the correction may be applied at the end of the magnetization phase, rather than the end of the demagnetization phase.

It will be appreciated that in further embodiments, the correction may be applied at any point during the switching cycle.

In further embodiments, the correction procedure provided by the correction circuit 600 may be applied based on one or more of the following conditions:

every switching cycle
  every N switching cycles, where N is an integer
  non-periodically
  on demand, as determined either from measured errors or
    from an external source
  when calculated errors exceed a pre-defined threshold
  at mode changes (for example when changing from single
    phase operation to multi phase operation)
  when transients are detected (for example load transients,
    supply transients or temperature changes)

These corrections can thus prevent any residual errors from accumulating. The corrections, thought they might still have some residual errors themselves, may be enforced whenever necessary thus clamping the (DIL-IL) error.

Figure 11:
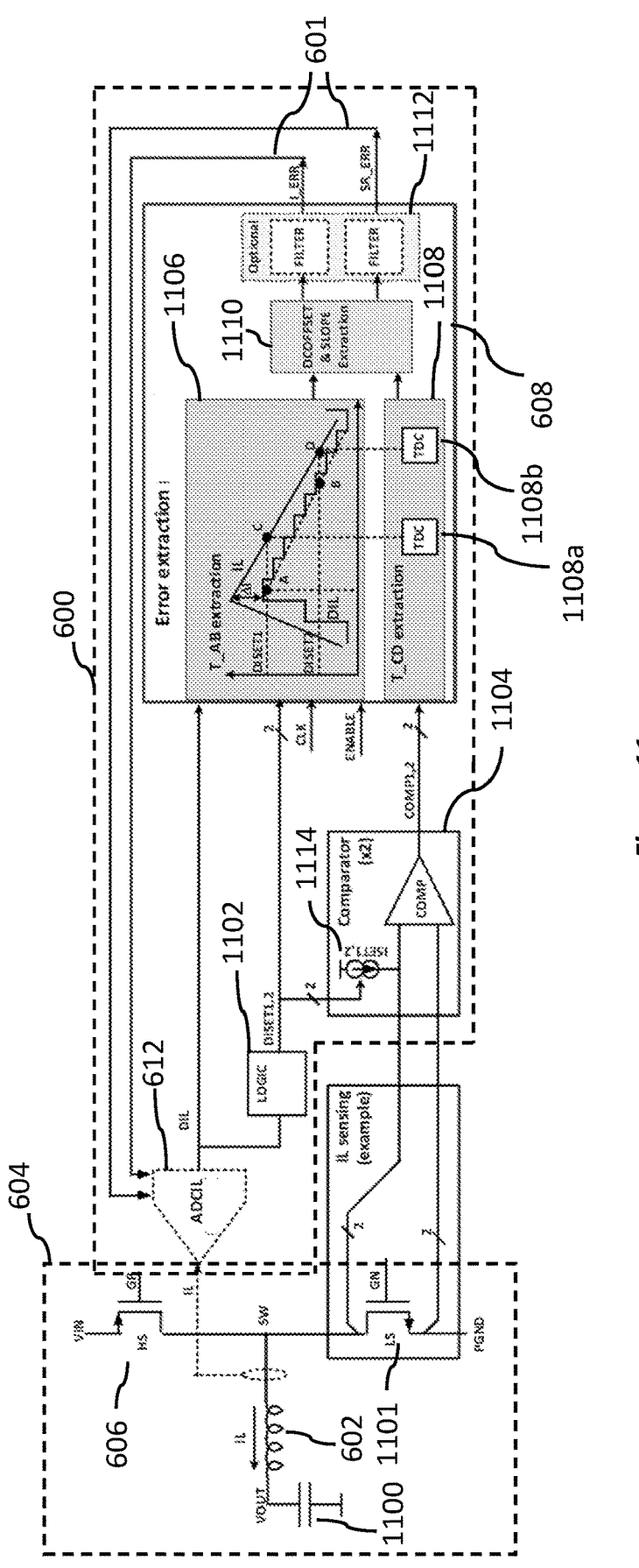
FIG. 11 is a schematic of a specific embodiment of the correction circuit and the switching converter, in accordance with a third embodiment of the present disclosure.

FIG. 11 is a schematic of a specific embodiment of the correction circuit 600 and the switching converter 604, where the switching converter 604 is a buck converter, and in accordance with a third embodiment of the present disclosure. In the present embodiment, the buck converter 604 comprises a capacitor 1100, the power switch 606 being a high side switch, and a low side switch 1101; the correction circuit 600 comprises a logic block 1102 and two comparator units 1104; an analog to digital converter (which may function as the current synthesiser 612 as described previously, with DIL being generated based on equations (1) and (2)); the comparison circuit 608 comprises a timing extraction unit 1106, a timing extraction unit 1108, an offset and relative slope error extraction unit 1110, and, optionally, a filter unit 1112. The timing extraction unit 1108 comprises time to digital converters 1108a, 1108b.

It will be appreciated that the ADC 612 represents one method of generating the digitized inductor current DIL, and further embodiments may use alternative methods of digitized inductor current DIL generation, in accordance with the understanding of the skilled person. The method of digitized inductor current DIL may, for example, be sensor based or sensor-less.

Each of the comparator units 1104 comprise a comparator in the present embodiment. It will be appreciated that in further embodiments, alternative implementations are possible, in accordance with the understanding of the skilled person.

In the present example, the current flow IL is sensed by measuring the voltage drop across the low side switch LS 1101, and is described in more detail below. In a further embodiment, the current flow IL may be sensed using the HS switch 606 and the alignment of IL and DIL can then happen during MAG instead of during DEMAG. As discussed previously the analog current signal IL (that is used for comparison with the digitized current signal DIL) and the current flow through the inductor 602 are both denoted by the variable "IL" to denote that the analog current signal IL is representative of the current flow through the inductor. The logic block 1102 is used to generate DISET1 and DISET2 such that they are between the peak of DIL and valley of DIL.

In the present embodiment, the offset error signal (denoted by I_ERR) and the relative slope error (denoted by SR_ERR) are examples of the correction signal 601 as described previously. Using the information provided by these signals, the current synthesizer 612 corrects the offset error and the relative slope error in the generation of the digitized inductor current DIL.

Figure 12:
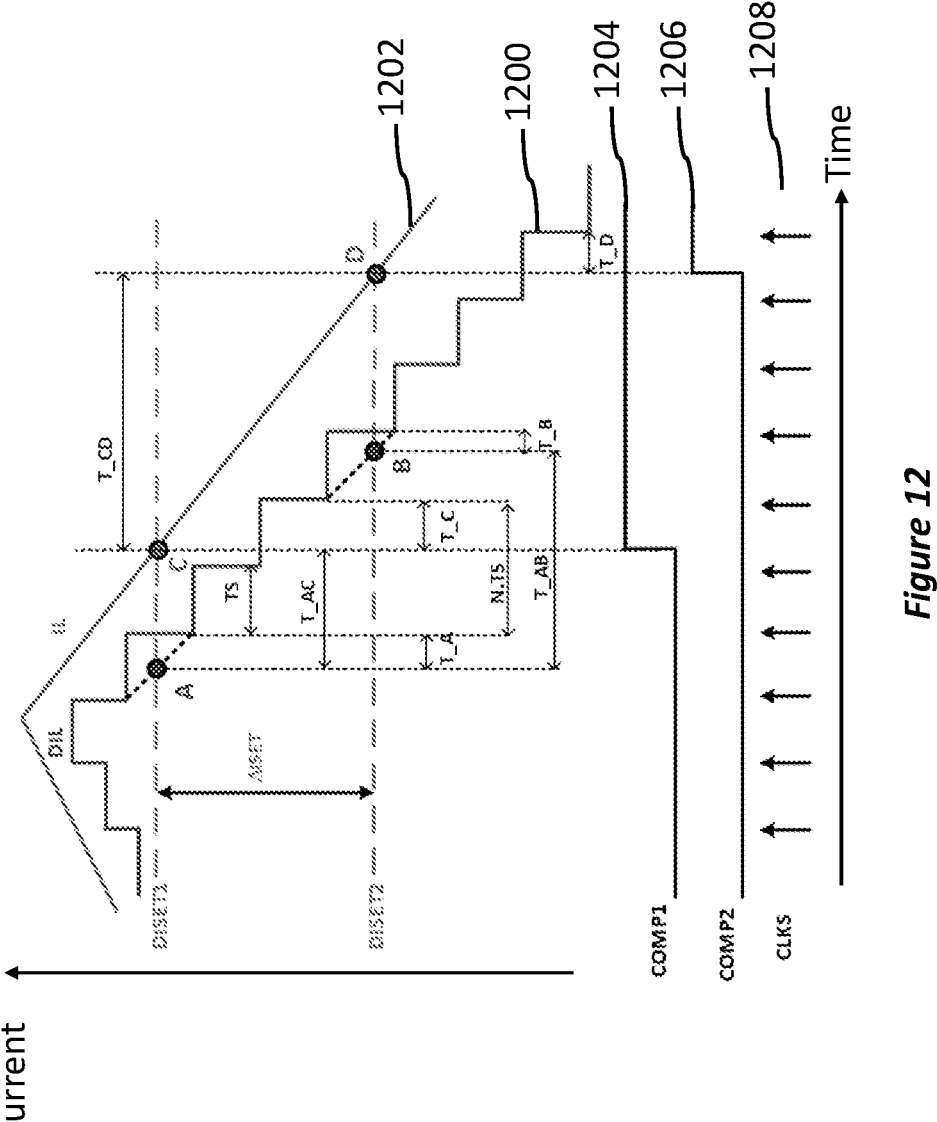
FIG. 12 is a timing showing the digitized current signal and the analog current signal during operation of an example embodiment of the present disclosure, for example, in relation to the apparatus presented in FIG. 11.

FIG. 12 is a timing showing the digitized current signal DIL (a trace 1200) and the analog current signal IL (1202) during operation of an example embodiment of the present disclosure, for example, in relation to the apparatus presented in FIG. 11. There is also shown a first comparator output signal COMP1 (a trace 1204) being an output from one of the comparators of one of the comparator units 1104; a second comparator output signal COMP2 (a trace 1206) being an output from the comparator of the other comparator unit 1104; and a clock signal CLKS (a trace 1208).

In previous timing graphs, the digitized inductor current DIL was shown as continuous time. As discussed, in practice the digitized inductor current DIL will be a discrete-time, discrete-value digital signal. The analog current signal IL is representative of the real inductor current so is continuous in time and values.

It will be appreciated that there are multiple possible methods to determine the timing of the points as discussed previously. The following discussion relates to one such example method as described in relation to FIGS. 11 and 12.

Points C and D on FIG. 12 are referenced to the real current flow IL (t) through the inductor 602. In the present example, the comparator units 1104 are used to detect the analog inductor current IL and compare the analog inductor current IL to the thresholds ISET1, ISET2. Each of the two comparator units 1104 is configured to compare the analog inductor current IL to one of the thresholds ISET1, ISET2.

In the present embodiment, the comparators would detect the digitized inductor current IL as a voltage drop across the low side switch's 1101 device resistance. The thresholds ISET1, ISET2 are voltage references that are obtained via a DAC 1114 from the digital thresholds DISET1, DISET2.

Assuming zero offset and zero delays for the comparators of the comparator units 1104, the outputs COMP1 and COMP2 will be generated. The rising edge of COMP1 represents point C and rising edge of COMP2 represents point D. The delay between these signals can then be measured and converted to a digital number via the timing extraction unit 1108 comprising the Time to Digital Converters 1108a, 1108b. It will be appreciated that in further embodiments alternative methods may be used to extract the timing delay, in accordance with the understanding of the skilled person.

Points A and B are referenced to the digitized inductor current DIL[n], which is a discrete-time, discrete-value signal. A simple way to compute the T_AB delay is to monitor the digitized inductor current DIL values at each clock cycle and determine whether the DISET1 (or DISET2) level has been crossed.

By knowing the values of the digitized inductor current DIL before and after the crossing, interpolation (for example linear interpolation) can be undertaken to determine the time that the digitized inductor current DIL crossed DISET1 or DISET2. By knowing the integer number of clock cycles between A and B and the fractional part of a processing period TS, the time step T_A and the time step T_B, one can calculate the total T_AB. T_AB may correspond to ΔT_DIL as described in relation to FIG. 8.

Determination of the delay T_AC uses two points referenced two the two different signals DIL, IL that are in different domains (digital and analog). A potential solution is to measure the time T_C instead of directly measuring T_CD. This then allows T_AC to be computed as:

$$T\_AC = T\_A + N \cdot TS - T\_C \qquad (14)$$

where N is the integer number of clock periods elapsed between end of the T_A measurement and the end of T_C measurement, and N=2 in FIG. 12.

It will be appreciated that the method used to determine T_AC may also be applied in the determination of T_BC or T_BD.

It will be appreciated that the digitized inductor current DIL and the analog inductor current IL as shown in FIG. 12 comprise linear slopes as their values both rise and fall.

It will be appreciated that the method of extracting time delays T_AB, T_CD, T_AC, T_BD as described in relation to FIG. 12 may also be applied to non-linear slopes, for example including exponentially decaying waveform portions for both IL and DIL. However, the accuracy might be degraded when compared to the linear examples, as the previously described method uses a linear slope approximation. It will be appreciated that for non-linear slopes, different methods to determine the delays may be performed, in accordance with the understanding of the skilled person.

Figure 13:
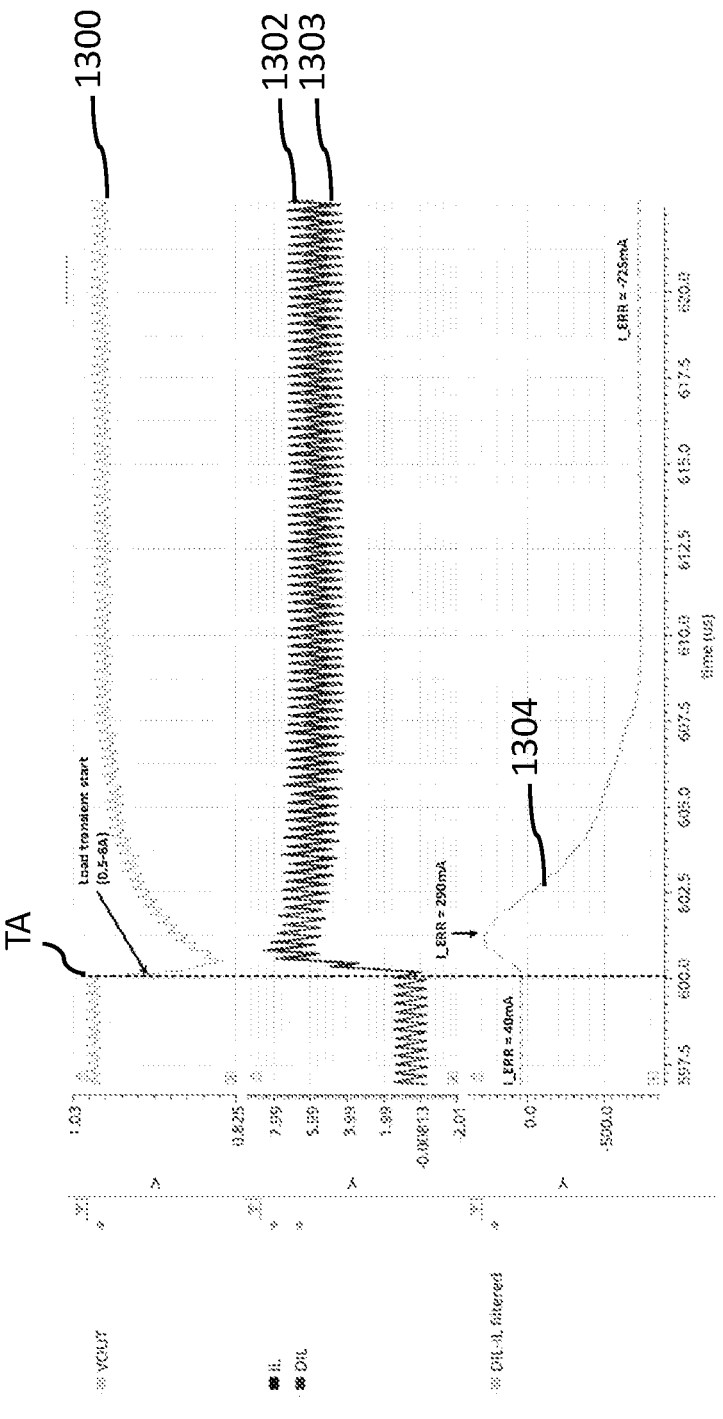
FIG. 13 is a timing graph showing simulation results of a practical implementation of a known system that uses a low bandwidth correction mechanism.

FIG. 13 is a timing graph showing simulation results of a practical implementation of a known system that uses a low bandwidth correction mechanism. There is shown an output voltage of a buck converter (a trace 1300); the analog inductor current IL (a trace 1302); the digitized inductor current DIL (a trace 1303); and the current error I_ERR which is equal to DIL-IL after filtering (a trace 1304). The traces 1302, 1303 appear to overlap in the graph.

The error I_ERR before the transient, as occurring at a time TA, is small due to a long settling time (more than 500 μs). After the load transient, a large error I_ERR is rapidly accumulated. The error I_ERR reduces with time to a minimum value of −740 mA at a very slow rate.

Figure 14A:
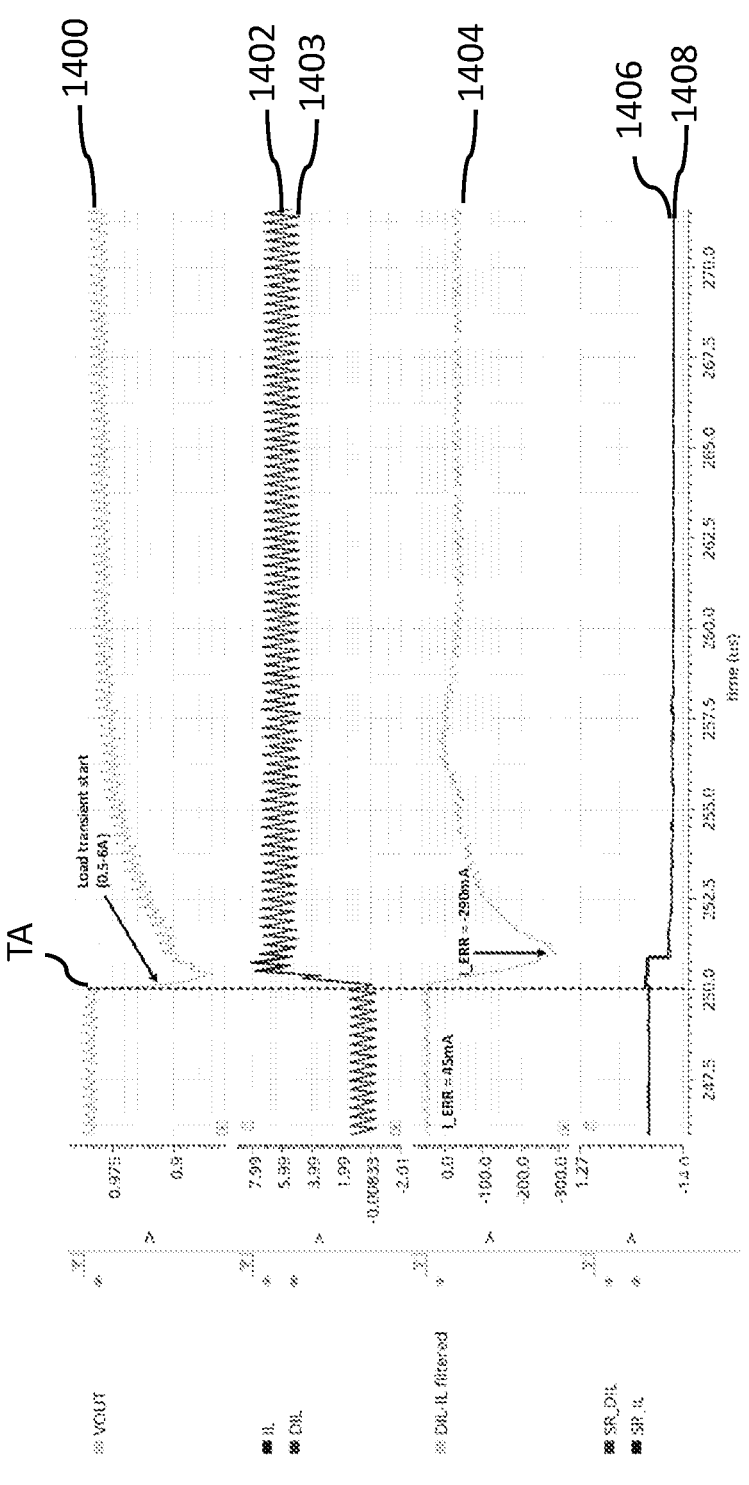
FIG. 14(a) is a timing graph showing simulations results of a practical implementation of the system illustrated in FIG. 11.

FIG. 14(a) is a timing graph showing simulations results of a practical implementation of the system illustrated in FIG. 11, and using cycle-by-cycle correction. The present simulation results shown the same load transient as shown in FIG. 13 and in the present example, the system reaches a steady state faster than the example shown in FIG. 13. There is shown the output voltage of the buck converter (a trace 1400); an analog inductor current IL (a trace 1402); a digitized inductor current DIL (a trace 1403); a current error I_ERR being equal to DIL-IL after filtering (a trace 1404); a digitized inductor current slope SR_DIL (a trace 1406); and an analog inductor current slope SR_IL (a trace 1408).

The error I_ERR starts from a similar value (45 mA) and reaches-290 mA due to the load transient induced errors. The error I_ERR is then rapidly corrected. The SR_IL and SR_DIL are also shown before and after the load transient. SR_IL and SR_DIL converge quickly despite having filtering applied to the slope correction. In a further embodiment, the relative slope error may be fully corrected in one cycle.

Figure 14B:
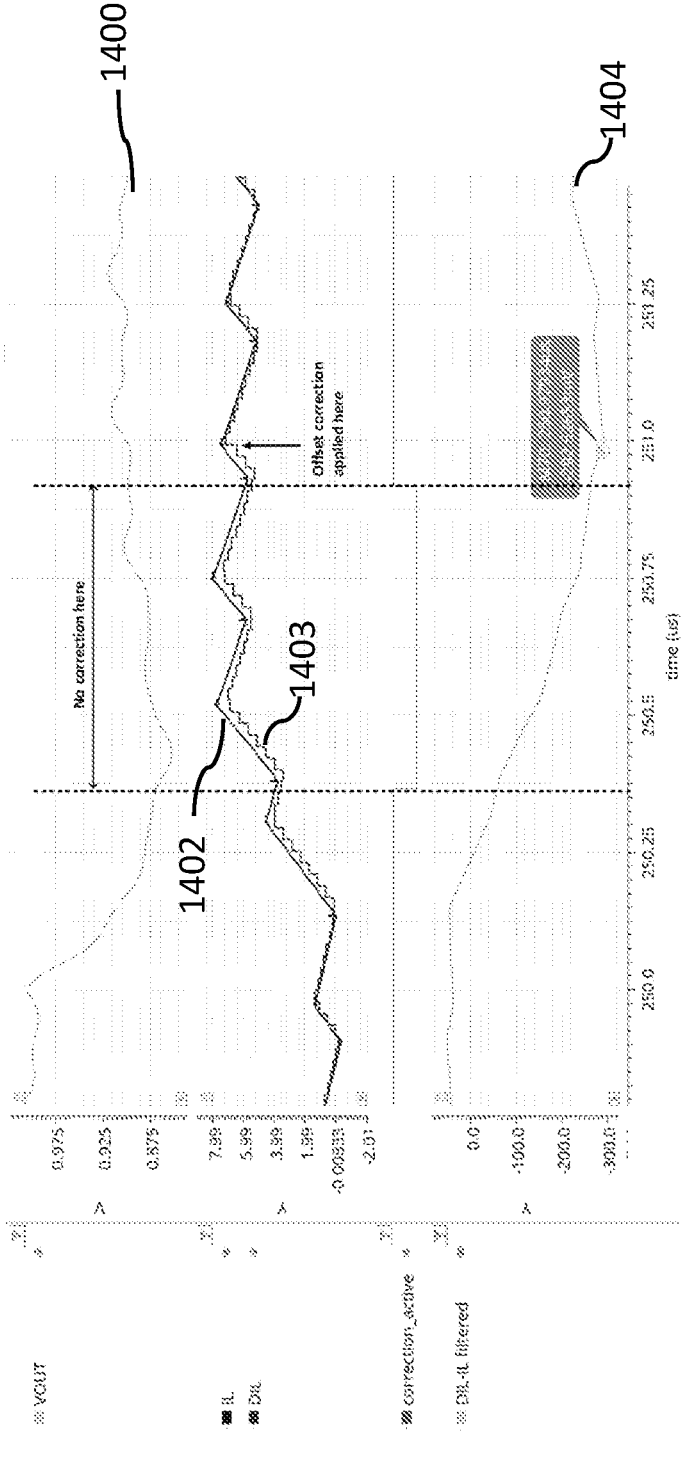
FIG. 14(b) is the timing graph of FIG. 14(a) over a shorter time scale.

FIG. 14(b) is the timing graph of FIG. 14(a) over a shorter time scale. The offset correction is applied at the end of MAG (t=251 μs).

Figure 15:
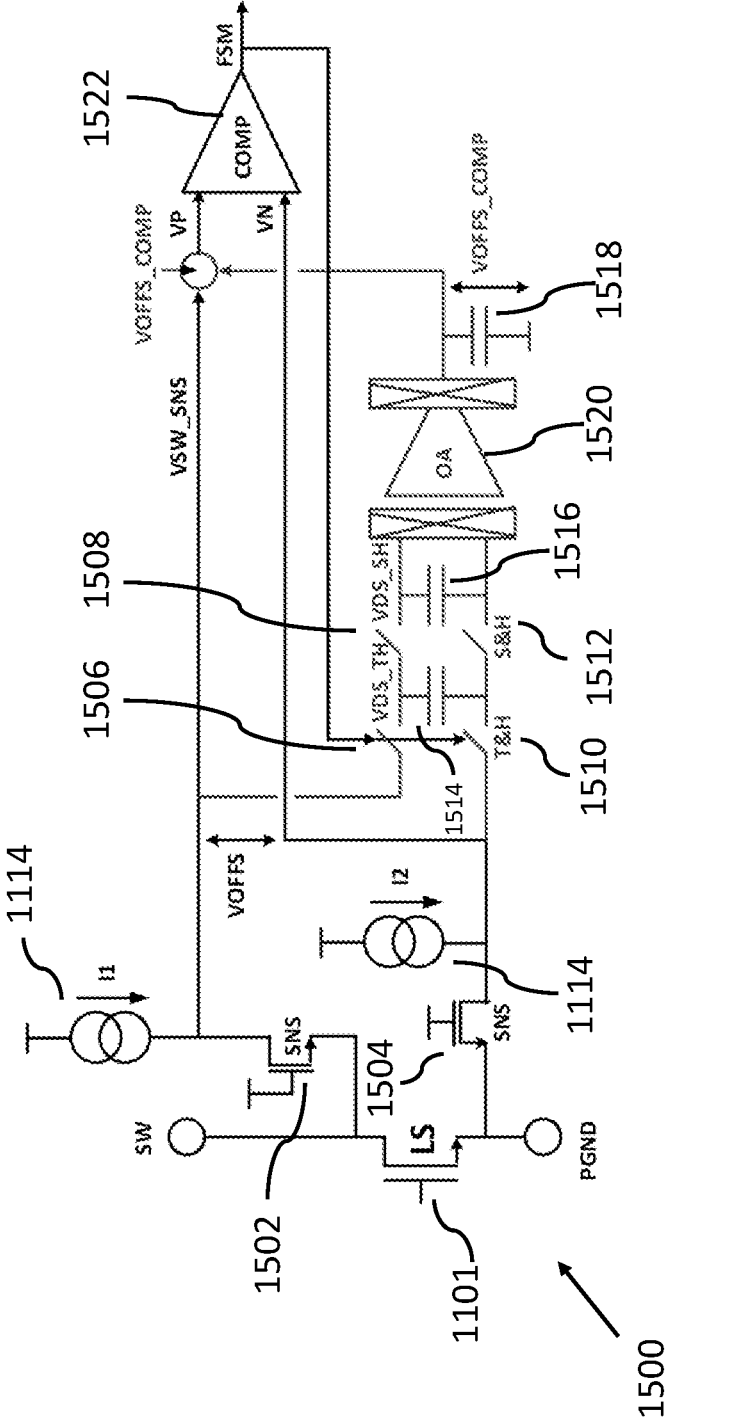
FIG. 15 is a schematic of a comparator unit that may be used for one or both of the two comparator units of FIG. 11.

FIG. 15 is a schematic of a comparator unit 1500 that may be used for one or both of the two comparator units 1104 of FIG. 11. The comparator unit 1500 comprises switches 1502, 1504, 1506, 1508, 1510, 1512; capacitors 1514, 1516, 1518; an op amp 1520 and a comparator 1522.

The examples above mentioned the desirability of a zero-delay, zero-offset comparator to determine the points C and D. For the present disclosure, some approximations can be made that allow to effectively emulate a zero-delay, zero-offset comparator. The present example can achieve zero offset and zero delays when used in embodiments disclosed herein by clarifying that the nature of the buck converter (or other switching converter) allows some assumptions regarding the inputs to these comparators to be made.

In determining the T_CD, the absolute comparator delay is not important, as long as the delays between the two comparators are matched. The absolute delay of the comparator is, however, important for offset correction (based on either point C or D).

In consideration of FIG. 15, one of the comparator's 1522 inputs will be constant (VN) and the other input will have a relatively predictable slope, defined by the SR_IL. Current sources 1114 are sized in such a way that the comparator 1522 toggles when IL=ISET1 of IL=ISET2.

This system 1500 can achieve near zero-offset and, considering the IL slope constant, a near zero-delay. The system 1500 samples the residual voltage VOFFS at the time the comparator 1522 toggles and, based on that, adjusts an additional offset (VOFFS_COMP) at the input of the comparator 1522 such that VP=(VSW_SNS+VOFFS_COMP).

The steady-state is achieved when the comparator 1522, COMP, toggles exactly when the residual offset, VOFFS, is zero. This results in effectively zero-delay and zero-offset comparator.

This works if the slope of the inductor current, SR_IL does not change. When the slope changes (due to VIN/VOUT, load transient or temperature effects), the system will introduce an error until settling again to the new steady-state.

In summary, embodiments of the present disclosure may be used to correct for the DIL-IL error, both in terms of offset and ripple (via slope adjustments). Specific embodiments described here perform correction of offset errors in a digitized inductor current DIL in a switching mode power converter by aligning it to one or more measured points of the real inductor current (or a signal derived from the real inductor current), labelled "IL". Embodiments of the present disclosure perform correction of the slope (slew rate) errors of a digitized inductor current DIL in a switching mode power converter by aligning it to two or more measured points of the real inductor current (or a signal derived from the real inductor current), labelled "IL". Embodiments of the present disclosure perform correction of both offset and slope (slew rate) errors of a digitized inductor current DIL in a switching mode power converter by aligning it to two or more measured points of the real inductor current (or a signal derived from the real inductor current), labelled "IL". Embodiments of the present disclosure use delay measurements (in analogue domain) and direct delay calculations (in digital domain) in the computation of offset and slope (slew rate) correction.

Various improvements and modifications may be made to the above without departing from the scope of the disclosure.

The invention claimed is:

1. A correction circuit configured to:
   compare a digitized current signal to an analog current signal, wherein the digitized current signal is a digital representation of the analog current signal, and the analog current signal is a current flowing through an energy storage element; and
   correct one or more errors in the digitized current signal based on the outcome of the comparison.

2. The correction circuit of claim 1, wherein the digitized current signal is provided by a current synthesizer.

3. The correction circuit of claim 2, is further configured to:
   generate a correction signal that is dependent on the outcome of the comparison; and
   provide the correction signal to the current synthesizer, the correction signal being used by the current synthesizer for correcting the one or more errors in the digitized current signal.

4. The correction circuit of claim 1 is further configured to correct an offset error between the digitized current signal and the analog current signal.

5. The correction circuit of claim 4 is further configured to:
   compare the digitized current signal to the analog current signal to determine the offset error; and
   correct the digitized current signal using the determined offset error.

6. The correction circuit of claim 5 is further configured to:
   determine the offset error by:
      detecting a first time step when the digitized current signal crosses a first digital threshold;
      detecting a second time step when the analog current signal crosses a first analog threshold;
      calculating a first duration between the first time step and the second time step;
      determining a first slope of at least one of the digitized current signal and the analog current signal; and
      multiplying the first duration by the first slope, thereby determining the offset error.

7. The correction circuit of claim 6, wherein the first digital threshold is approximately equal to a digitized first analog threshold.

8. The correction circuit of claim 6 comprises a comparator configured to provide an output that is indicative of analog current signal crossing the first analog threshold, the output being used to determine the second time step.

9. The correction circuit of claim 1 is further configured to correct a relative slope error between the digitized current signal and the analog current signal.

10. The correction circuit of claim 9 is further configured to:
   compare the digitized current signal to the analog current signal to determine the relative slope error; and
   correct the digitized current signal using the relative slope error, as determined.

11. The correction circuit of claim 10 is further configured to:
   determine the relative slope error by:
      detecting a first time step when the digitized current signal crosses a first digital threshold;
      detecting a second time step when the analog current signal crosses a first analog threshold;
      detecting a third time step when the digitized current signal crosses a second digital threshold;
      detecting a fourth time step when the analog current signal crosses a second analog threshold;
      calculating a first digital slope delay between the first time step and the third time step;
      calculating a first analog slope delay between the second time step and the fourth time step; and
      dividing the first analog slope delay by the first digital slope delay to calculate a first delay parameter, then subtracting one from the first delay parameter, thereby determining the relative slope error.

12. The correction circuit of claim 4 is further configured to correct a relative slope error between the digitized current signal and the analog current signal.

13. The correction circuit of claim 12 is further configured to correct the relative slope error prior to correcting the offset error.

14. The correction circuit of claim 13 is further configured to:
   compare the digitized current signal to the analog current signal to determine the relative slope error and the offset error; and
   correct the digitized current signal using the relative slope error and offset error, as determined.

15. The correction circuit of claim 14 is further configured to:
   determine the relative slope error by:
      detecting a first time step when the digitized current signal crosses a first digital threshold;
      detecting a second time step when the analog current signal crosses a first analog threshold;
      detecting a third time step when the digitized current signal crosses a second digital threshold;
      detecting a fourth time step when the analog current signal crosses a second analog threshold;
      calculating a first digital slope delay between the first time step and the third time step;
      calculating a first analog slope delay between the second time step and the fourth time step;
      dividing the first analog slope delay by the first digital slope delay to calculate a first delay parameter, then subtracting one from the first delay parameter, thereby determining the relative slope error.

16. The correction circuit of claim 15 is further configured to:
   determine the offset error by:
   calculate a first duration between the first time step and the second time step;
   determine a first slope of the analog current signal by:
      calculating an analog threshold difference by subtracting the second analog threshold from the first analog threshold; and dividing the analog threshold difference by the first analog slope delay; and multiply the first slope of the analog current signal by the first duration, thereby determining the offset error.

17. The correction circuit of claim 1 is further configured to correct one or more errors in the digitized current signal during operation of a switching converter comprising the energy storage element.

18. The correction circuit of claim 17, wherein the energy storage element comprises an inductor.

19. The correction circuit of claim 17 is further configured to correct the one or more errors in the digitized current signal:

two or more times during operation of the switching converter; or in response to an external signal; or in response to one of the one or more errors exceeding a threshold value; or in response to a mode change of the switching converter; or in response to a transient.

20. A method of correcting one or more errors in a digitized current signal, the method comprising:

comparing the digitized current signal to an analog current signal, wherein the digitized current signal is a digital representation of the analog current signal, and the analog current signal is a current flowing through an energy storage element; and correcting the one or more errors in the digitized current signal based on the outcome of the comparison.

\*     \*     \*     \*     \*